Jan. 18, 1944.   L. O. CARLSEN   2,339,679
MACHINE FOR PRODUCING GEARS
Filed Nov. 22, 1941   3 Sheets-Sheet 1

Inventor
LEONARD O. CARLSEN
By
Beshlainger
Attorney

Inventor
LEONARD O. CARLSEN

Jan. 18, 1944.　　　L. O. CARLSEN　　　2,339,679
MACHINE FOR PRODUCING GEARS
Filed Nov. 22, 1941　　　3 Sheets-Sheet 3

Inventor
LEONARD O. CARLSEN
By
Attorney

Patented Jan. 18, 1944

2,339,679

UNITED STATES PATENT OFFICE 2,339,679

MACHINE FOR PRODUCING GEARS

Leonard O. Carlsen, Rochester, N. Y., assignor to Gleason Works, Rochester, N. Y., a corporation of New York Application November 22, 1941, Serial No. 420,093

8 Claims. (Cl. 90—6)

The present invention relates to machines for producing gears and particularly to gear cutting machines of the intermittent indexing type employing a change gear or so-called universal type of indexing mechanism.

In gear cutting machines of the intermittent indexing type as heretofore built, the machine performs a complete cycle for each tooth pitch of the work. Each cycle ordinarily comprises feed of the tool into the work, cutting of a tooth space in the work, withdrawal of the tool from engagement with the work, and indexing of the work. When the machine is constructed or used to cut gears without generating roll, the drive to the work spindle is held stationary during cutting but is released and rotated when the tool is out of engagement with the work to effect the indexing. In machines for cutting gears with generating roll, the work spindle rotates during cutting and indexing is effected by imparting an additional rotation of an algebraic nature to the work spindle on each cycle when the tool is out of engagement with the work. In machines of the generating type employing a universal type index mechanism, the additional rotational movement for indexing is usually effected through a differential which is incorporated in the train of gearing that drives the work spindle during cutting. One element of this differential is locked against rotation during cutting and is released and actuated periodically to effect indexing.

In both the machines for cutting gears without generating roll and the machines for cutting gears with generating roll, as heretofore built, the machine must go through a complete cycle of operation for each index. There is no disadvantage to this, in fact this is what is required, when gears, that have teeth around their whole periphery, are to be cut. There is a distinct disadvantage to this, however, when segmental gears are to be cut. For instance, if a gear segment, that has, say only nine teeth out of a possible thirty for the full periphery, is to be cut on a machine of conventional design, the machine must go through nine cycles to cut the teeth of the segment and then through twenty-one idle cycles to return the work spindle and other parts of the machine to initial position ready for cutting of a new blank. This is, of course, a great waste of time because in each of the idle cycles, just as in each of the cutting cycles, the tools have to be fed into depth, the tools have to go through the motion of cutting, although of course during the idle cycles they are only cutting air, and they have to be withdrawn before the blank may be indexed through the angle of a single tooth space. The drawbacks in this regard of prior type machines have become increasingly serious with increased production of aeroplanes, for a number of gear segments are used in the average aeroplane for retracting the landing wheels, for adjusting the pitch of the propeller, etc.

The primary object of the present invention is to provide an indexing mechanism of the intermittent type for gear cutting machines which will permit of cutting segmental gears more efficiently.

A further object of the invention is to provide an improved indexing mechanism of the type described which may be applied to existing conventional gear cutting machines with but slight modification of such machines and which will enable those machines to be used selectively for cutting segmental gears or complete gears in the most efficient manner.

Other objects of the invention will be apparent hereinafter from the specification and from the recital of the appended claims.

One embodiment of the invention is illustrated in the accompanying drawings, in which.

Figure 1:
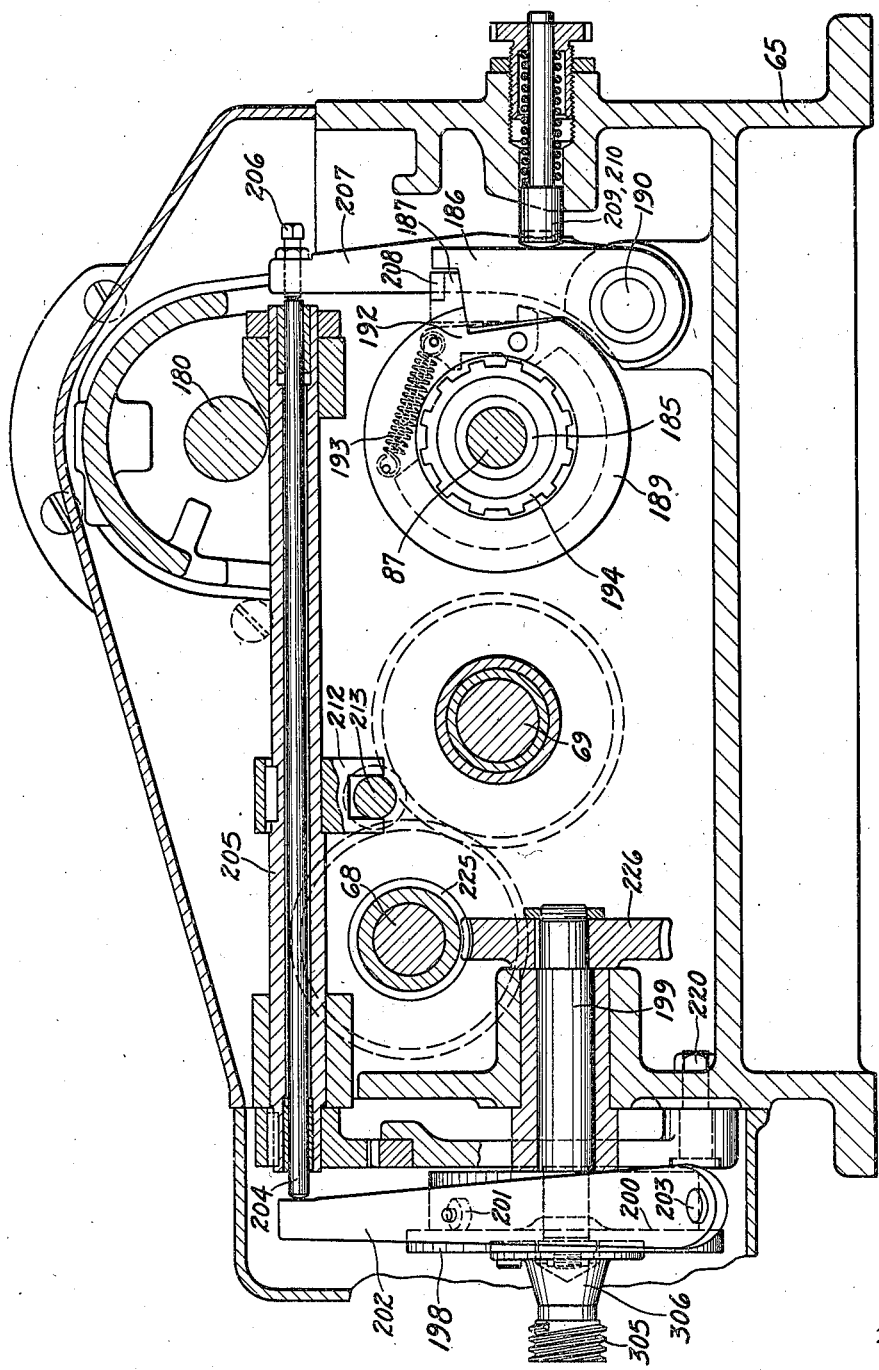
Fig. 1 is a sectional view through the index control mechanism and associated parts of a conventional type straight bevel gear cutting machine and illustrating how such a machine may be modified to practice the present invention.

The invention has been illustrated in the drawings as applied to a gear cutting machine of the type disclosed in the United States patent to Head, Finsen and Carlsen, No. 1,656,633, of January 17, 1928. In this machine, there is a differential incorporated in the train of gearing which drives the work spindle. The housing of this differential is locked against rotation during cutting and the rotation of the work spindle required for generation of the tooth profiles is effected through the other elements of the differential. Indexing is accomplished by disengaging a lock-dog that normally holds the differential housing against rotation, and rotating the differential housing. A cam, which is driven at a rate to make one revolution per machine cycle, controls the lock-dog.

In the improved machine, this cam is retained, but, in addition, a second cam is provided to also control the lock dog. The first cam is driven, as usual, at the rate of one revolution per cycle. The second cam is driven at the rate of one revolution per complete operation of the machine. During the cutting of the teeth of a segmental gear, the first cam operates once in each cycle, to unlock the differential housing of the machine to permit indexing the work spindle through the distance of a tooth space. After all of the teeth have been cut, the second cam comes into operation. It holds the index lock dog open a sufficient time for the work spindle to be indexed back to its starting position. In the operation of the second cam, then, the work spindle may be indexed through the equivalent of many tooth spaces without requiring relative feed and withdrawal movements of the tools for each pitch through which the work is indexed. Thus the work spindle can be indexed quickly back to initial position, once all of the teeth in the segment have been cut.

Reference will now be had to the drawings for a more detailed description of the invention. The parts which are common to the machine of the Head et al. Patent No. 1,656,633 above mentioned are identified by the same reference numerals as employed in that patent. Parts which are new to the present application, are designated by reference numerals from 305 up.

In order adequately to understand the present invention, the operation and actuating mechanism of the Head et al. machine will first be described generally. The description herein given is, however, very general and for a more detailed description, reference should be made to the Head et al. patent.

Figures 4, 5:
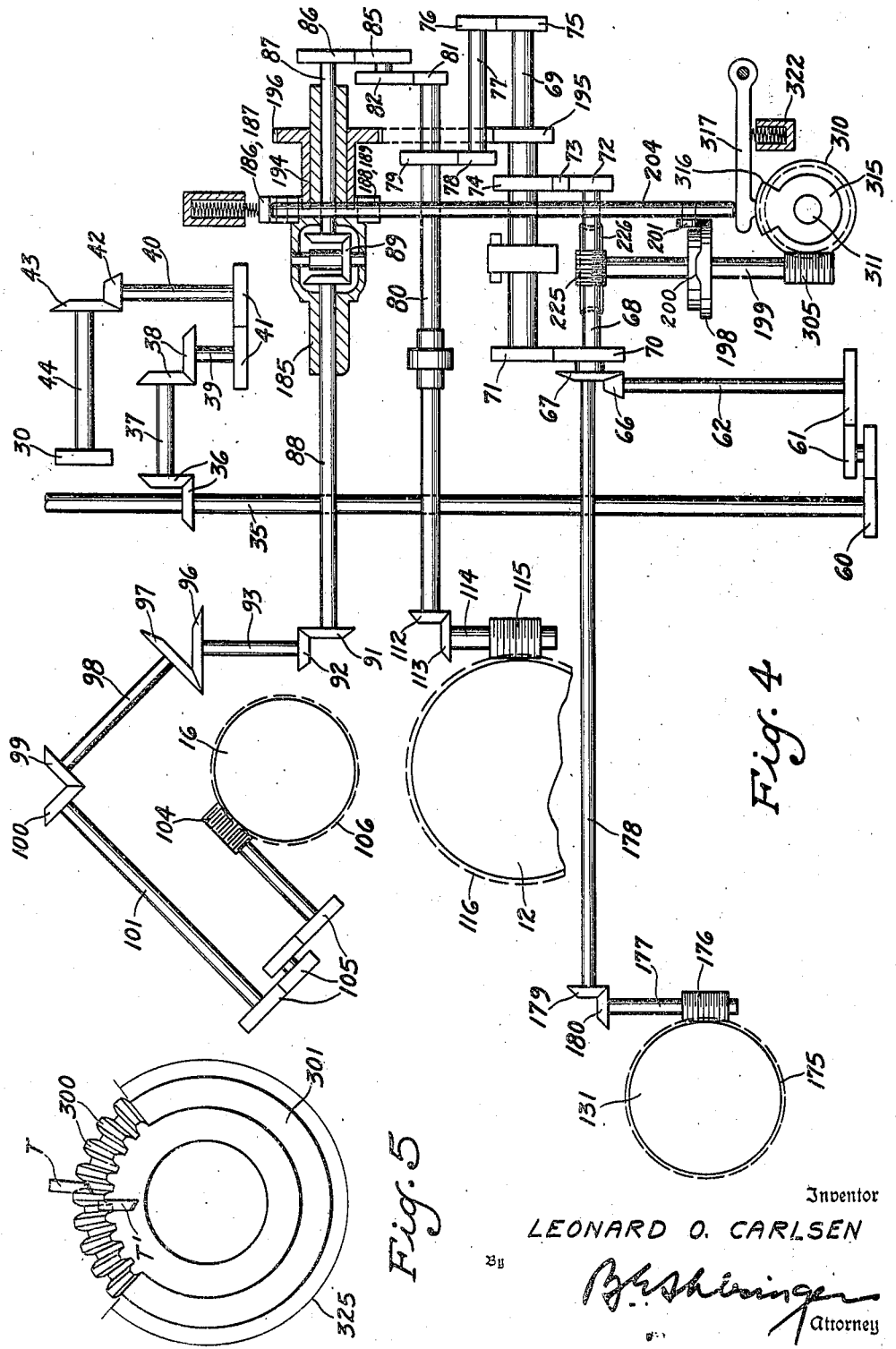
Fig. 4 is a drive diagram of the machine as modified.
Fig. 5 is an elevational view of a segmental bevel gear of typical design, showing the type of work for which the mechanism of the present invention is particularly proposed.

The Head et al. machine employes two reciprocating planing tools, which are reciprocated simultaneously in opposite directions to cut straight teeth on a gear blank. The tool mechanism of this machine may be driven, as described in the Head et al. patent, from a main drive shaft 35 (Fig. 4) through the bevel gearing 36, the shaft 37, the bevel gearing 38, the shaft 39, the spur change gears 41, the shaft 40, the bevel gears 42 and 43, the shaft 44 and the crank 30.

The generating motion of this machine is produced by rotation of a cradle, on which the tools are mounted, and of the work spindle in timed relation. The drive to the cradle is from the main shaft 35 and includes the spur gear 60, which forms one of a set of change gears of which the other members are denoted at 61, the shaft 62, the bevel gears 66 and 67. The bevel gear 67 is secured to a shaft 68 which drives the shaft 69 alternately in opposite directions through a standard reversing mechanism. This reversing mechanism has not been disclosed in detail in the present drawings, but it is sufficient to say that the shaft 68 may drive the shaft 69 in one direction through the spur gears 70 and 71 or in the opposite direction through the spur gears 72, 73, and 74. The shaft 69 drives the cradle 12 through the spur gears 75, 76, 78, 79, the shaft 80, the bevel gears 112 and 113, the shaft 114, the worm 115 and the wormwheel 116. The wormwheel 116 is secured to the cradle.

During cutting, the work is rotated on its axis in time with the cradle rotation to effect generation of the tooth profiles. The drive to the work is from the reversing shaft 69 through the spur gears 75, 76, 78, 79, the shaft 80, the spur gears 81, 82, 85, and 86, the shaft 87, the gears 89 of a differential, which is housed in the differential housing 185, the shaft 88, the bevel gears 91 and 92, the shaft 93, the bevel gears 96 and 97, the shaft 98, the bevel gears 99 and 100, the shaft 101, the index change gears 105, the worm 104 and the wormwheel 106. This wormwheel 106 is secured to the work spindle 16 of the machine.

The feed of the work into the tools and its periodic withdrawal for indexing is controlled by a cam 131 which is driven continuously in one direction from the shaft 68. This shaft is coupled to the shaft 178, and the shaft 178 drives the cam 131 through the bevel gears 179 and 180, the shaft 177, the worm 176, and the wormwheel 175. This wormwheel 175 is secured to the feed cam 131.

The differential housing 185 is stationary during cutting. It is locked against rotation by a pair of lock levers 186 and 187 (Figs. 1 and 4) which serve to hold the differential housing against rotation in either direction. These lock levers cooperate with stop plates 188 and 189 that are secured to the differential housing 185. The stop levers 186 and 187 are pivotally mounted on a stud 190 which is secured in a bracket 65 that is fastened in the base of the machine. The stop lever 187 is adapted to engage the tail of a pawl 192 which is pivotally mounted on the differential housing 185 between the stop plates 188 and 189. When the stop levers 186 and 187 are moved out of locking position, the pawl 192 is released. As soon as the pawl 192 is released, it is forced by the spring 193 into engagement with the ratchet wheel 194. This ratchet wheel is journaled on the shaft 87 and on the differential housing 185 and it is integral with or is secured to a gear 196. This gear is driven from the shaft 69 through the gear 195. When the pawl 192 engages the ratchet wheel 194, then, motion is transmitted through the ratchet wheel to the differential housing, thus imparting an added algebraic motion to the train of gears which rotate the work spindle. This added motion serves to index the work spindle.

To effect indexing during the cutting cycles of the machine, the stop levers 186 and 187 are tripped out of engagement with the differential housing periodically, once in each cutting cycle. For this purpose, the cam 198 is provided. This cam is keyed to a shaft 199 that is driven from the shaft 68 through the worm 225 and the wormwheel 226. The cam is provided with a cam surface 200 (Figs. 1 and 2) which cooperates with a roller 201 that is secured to a lever 202. The lever 202 is pivoted at one end at 203 in the bracket 65. The free end of this lever contacts with one end of a rod 204 (Figs. 2 and 4) which slides in an oscillatable sleeve 205 (Fig. 1). The opposite end of the rod 204 contacts with a set screw 206 carried by the lever arm 207 which is pivotally mounted on the stud 190. This lever arm 207 is so connected with the stop lever 187 that when the lever 207 is rocked by the rod 204, the stop lever 187 is withdrawn from engagement with the stop plate 189. This stop lever 187 carries a lug 208, which is adapted to engage the lever 186 when the stop lever 187 is withdrawn from engaging position, to rock the stop lever 186 out of engaging position also. The stop levers 186 and 187 are normally pressed into locking position by spring pressed plungers housed in the bracket 65, one of which is shown at 209.

The mechanism thus far described may be identical with the mechanism provided for the same purpose in the machine of Patent No. 1,656,-633. This mechanism operates so that the work is fed into the reciprocating cutting tools, the tools are rolled with the work to generate a tooth of the blank, then the work is withdrawn from engagement with the tools and then the work is indexed. For cutting of a segmental gear, however, such as the gear 301 (Fig. 5) this cycle is only required during actual cutting of the teeth. When the last tooth of the segment has been cut, it is then desirable to discontinue this cycle and to index the work spindle rapidly through an angle 325 equivalent to that between the last and first teeth of the work to return the work spindle to initial position, ready to operate on a new gear blank. For this purpose the mechanism of the present invention is provided.

This mechanism is driven from a worm 305 which is keyed to a supporting member 306 and which is secured against a shoulder on that member by means of a nut 307. The supporting member 306 is fastened by screws 308 to the cam 198 to rotate with that cam.

The worm 305 (Figs. 2, 3, and 4) meshes with a wormwheel 310 which is keyed to a shaft 311 that is journaled in suitable bearings in a bracket 312. The bracket 312 is secured to the bracket 65 by bolts 313. The shaft 311 is held against axial movement relative to the bracket 312 by a nut 314 which threads onto the lower end of the shaft.

Fastened to the upper end of the shaft 311 to rotate therewith is a cam 315. This cam is formed with a single lobe denoted at 316. The cam 315 is adapted to operate a lever 317. The lever 317 is pivotally mounted by means of the pin 318 in the bracket 65. It carries a shoe 319 which is adapted to ride on the peripheral surface 316. The lever 317 is adapted to engage with a lug or knob 320 that is integral with or secured to the lever 202. Thus motion of the lever 317 under actuation of the cam 315 may be transmitted to the lever 202 and through the lever 202, rod 204, and lever 207 (Fig. 1) to the lock dogs 186 and 187.

The pressure of the spring pressed plungers 209 and 210, when transmitted through the lever arm 207, rod 204 and lever 202 is sufficient to urge the lever 317 (Figs. 2, 3, 4) and its shoe 319 into operative relation with the cam 315. A spring pressed plunger 322, which is housed in a boss 323 formed at one side of the arm 317, tends to rock the lever 317 and its roller 319 away from engagement with the cam 315. The plunger 322 engages with the upright portion 324 of the bracket 312. The rise of the lobe 316 of the cam 315 is rather abrupt and the purpose of the plunger 322 is to hold the shoe 319 away from the lower dwell portion of the cam 315 so that the movement of the lever 317 will not be so abrupt when the roller rides up onto the lobe portion 316 of the cam.

As will be obvious, when the shoe 319 of the lever 317 is riding on the lobe 316 of the cam 315, lever 202 will be swung about its pivot 203 to force the rod 204 to the right from the position shown in Fig. 1 to cause the stop dogs 186 and 187 to be disengaged from the stop plates 185 and 184 and allow the pawl 192 to engage the ratchet wheel 194 to transmit the motion of the gears 195 and 196 to the differential housing 185 to rotate the work spindle. The gearing 305, 310 is so selected that the cam 315 will make one revolution during a complete operation of the machine. The lobe portion 316 of the cam 315 is so located angularly with reference to the axis of the shaft 311 that this lobe portion comes into operation after the last tooth 300 of the segment 301 (Fig. 5) has been cut, and the lobe portion 316 is of sufficient angular extent to hold the lock dogs 186 and 187 out of locking position for a sufficient length of time to permit the work spindle to be rotated through an angle, such as denoted at 325, in Fig. 5, which is sufficient to index the work spindle back to its initial position.

Figure 2:
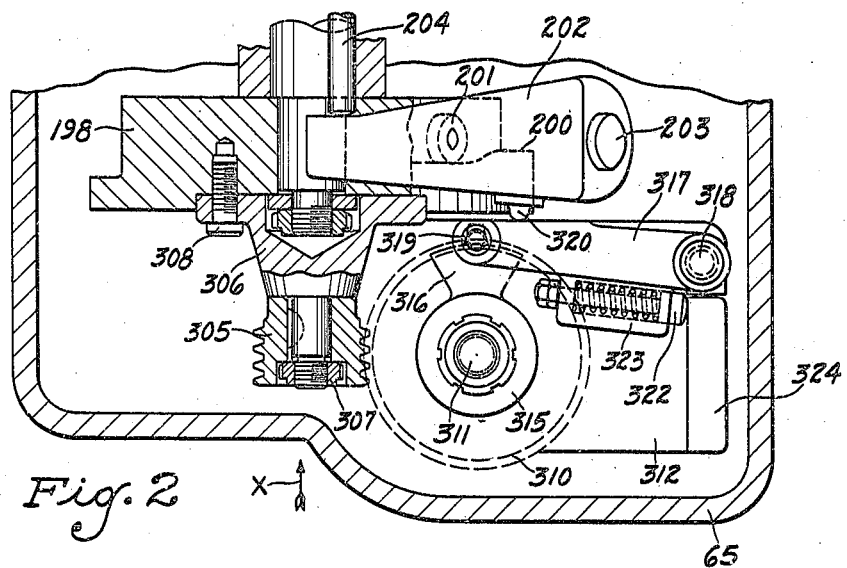
Fig. 2 is a fragmentary sectional view taken at right angles to the view of Fig. 1 and showing particularly the parts which are applied to the machine to practice the present invention.
Figure 3:
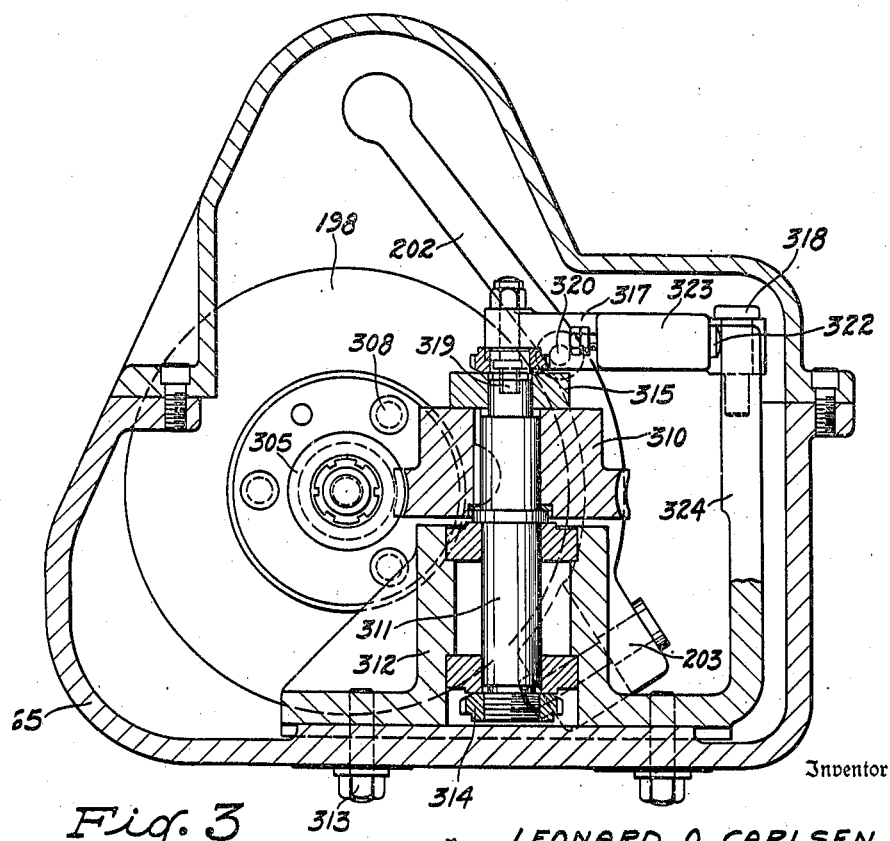
Fig. 3 is a view looking in the direction of the arrow X of Fig. 2, parts being broken away and shown in section.

The operation of the machine illustrated will be obvious from the preceding description but may briefly be summed up here. For cutting each tooth 300 of the segmental gear 301 (Fig. 5), the work is fed into the reciprocating planing tools T and T', the tools are rolled relative to the blank by the generating mechanism of the machine, then the work is withdrawn from engagement with the tools, and then the blank is indexed. The indexing operation is accomplished when the roller 201 of the lever 202 rides up on the high part of the cam 198 (Fig. 2). This causes the lever 202 to be rocked about its pivot 203 to move the rod 204 to the right from the position shown in Fig. 1. Thus the lever 207 is rocked on the stud 190, causing the lock dogs 186 and 187 to be withdrawn from engagement with the stop plates 188 and 189. This releases the pawl 192, allowing this pawl to drop into engagement with one of the teeth of the ratchet wheel 194. When this occurs, the motion of the gears 195 and 196 is transmitted through the ratchet wheel 194 and pawl 192 to the differential housing 185, causing rotational movement to be imparted to the train of gearing which drives the work spindle. This additional motion effects the indexing. When the roller 201 of lever 202 has ridden down off of the high part of the cam 198, the lock dogs 186 and 187 drop back onto the periphery of the stop plates 188 and 189. When the stop plates have made one revolution, the lock dogs return into locking position, disengaging the pawl 192 from the ratchet wheel 194 and stopping the indexing operation. The work is then returned into engagement with the tools and the generating roll begins as before to generate a new tooth of the gear blank. This sequence of operations comprising feed, cutting, withdrawal and indexing proceeds until all of the teeth 300 of the segmental gear 301 have been cut. During this time, the roller 319 of lever 317 is held clear of the lower dwell portion of the cam 315 and the lever 317 is inoperative. When the last tooth of the gear 301 has been completed, however, the lobe 316 of the cam 315 engages the roller 319 of lever 317, rocking the lever 317 about its pivot 318 and causing this lever to rock the lever 202 about its pivot. This forces the rod 204 again to the right from the position shown in Fig. 1, causing the locking dogs 186 and 187 to be again disengaged from the stop plates 188 and 189. This allows the pawl 192 again to engage the ratchet wheel 194 and again the motion of the gears 195 and 196 is transmitted to the differential housing 185 and through the differential to the work spindle 16, rotating the work spindle.

The lobe portion 316 of the cam 315 is of sufficient angular extent to hold the locking dogs 186 and 187 in disengaged position long enough for the differential housing 185 to make sufficient revolutions to permit rotating the work spindle through the angle required to return it to initial position. Then the machine may be stopped by the usual automatic stop mechanism.

The segmental gear 301 shown in the drawings has nine teeth. If the gear was toothed for its full periphery it would have thirty teeth. In the cutting of the nine teeth, the work is fed nine times into the tools, the generating roll is effected nine times, the work is withdrawn nine times from engagement with the tools, and the work is indexed nine times through one pitch. Each cycle of operation may require six or more revolutions of the shaft 178 to rotate the control cam 131 through one revolution, and the differential housing 185 will be rotated only during that part of the revolution of the cam 178 when the work is withdrawn from the tools. When the ninth tooth of the segmental gear 301 has been cut, the cam 315 comes into action, and the differential housing is held unlocked long enough for the housing to make twenty-one successive revolutions to index the work spindle through the twenty-one pitches required to return the work spindle to starting position. The cam 131 does not have to make twenty-one revolutions during this period, however, nor does the shaft 178 have to make a multiple of twenty-one revolutions. The shaft 178 and cam 131 may, in fact, make fewer revolutions for indexing the work through the twenty-one pitches required to return the work spindle to starting position than for effecting the nine cycles required in the cutting of the nine teeth of the gear. This will depend on the gearing of the machine. In any event, a material saving in time will be effected as over a machine in which a whole cycle must be performed for each pitch indexed.

Now while the invention has been described in connection with the cutting of a segmental gear, it is to be understood that it may be applied also to the production of an intermittent gear. For this purpose the cam 315 might be geared to make a multiple number of revolutions per machine operation to hold the index lock-dogs open intermittently for a multiple of tooth pitches, or a multi-lobed cam to accomplish the same result might be provided instead of the single-lobed cam 315.

Furthermore, while the invention has been described in connection with a machine for generating gears, it will be understood that it may also be applied to machines for cutting gears without generating roll. In such case, a differential is not required; the work spindle may be held against rotation during cutting by a lock-dog and stop-plate and may be unlocked and rotated for indexing. It will be understood, also, that while the invention has been described in connection with a machine for cutting straight bevel gears, it is applicable to any type of gear cutting machine since the particular tool mechanism employed has nothing to do with the functioning of the apparatus of this invention. It will be understood also, that the term "cutting" is intended to include a grinding operation.

In general it may be said that while I have described one embodiment of the invention, the invention is capable of further modification and that this application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing gears, a work spindle, a stop-plate operatively connected to the work spindle, means for locking the stop-plate against rotation, means for rotating the stop-plate, when released, to rotate the work spindle, means for periodically holding said locking means disengaged long enough to permit indexing of the work spindle through the angular distance of one circular pitch of the work, and means operative automatically after a given number of such periodic indexing operations to hold said locking means disengaged long enough to permit indexing the work spindle through the angular distance of a multiple number of circular pitches of the work.

2. In a machine for producing gears, a work spindle, a stop-plate operatively connected to the work spindle, means for locking the stop plate against rotation, means for rotating the stop-plate, when released, to rotate the work spindle, means for periodically holding said locking means disengaged for a predetermined interval to permit indexing of the work spindle through a given angular distance, and means operative after a predetermined number of operations of said disengaging means to cause said disengaging means to hold the locking means disengaged for a longer interval of time to permit indexing of the work spindle through a different angular distance.

3. In a machine for generating gears, a work spindle, tool mechanism, a train of gearing including a differential for rotating the work spindle, means for locking one element of the differential against rotation during cutting, means for driving the other elements of the differential to effect generating rotation of the work spindle, means for actuating the first named element of the differential, when released, to effect indexing rotation of the work spindle, means for periodically disengaging said locking means for a predetermined interval, and means operative after a predetermined number of said periods to disengage said locking means for a different interval.

4. In a machine for producing gears having a normal machine cycle comprising alternate cutting and indexing, a work spindle, a stop plate operatively connected to the work spindle, means for locking the stop-plate against rotation, means for rotating the stop-plate, when released, to rotate the work spindle, means for disengaging the locking means, a cam driven at a rate to make one revolution per machine cycle and operatively connected to said disengaging means to actuate said disengaging means once on each revolution to permit indexing of the work spindle through a given angular distance, and a second cam driven at a different rate and also operatively connected to said disengaging means to actuate the same to effect indexing of the work spindle independently of the machine cycle.

5. In a machine for producing gears having a normal machine cycle comprising alternate cutting and indexing, a work spindle, a stop plate operatively connected to the work spindle, means for locking the stop plate against rotation, means for rotating the stop plate, when released, to rotate the work spindle, means for disengaging the locking means, a cam driven at a rate to make one revolution per machine cycle and operatively connected to said disengaging means to actuate the disengaging means once on each revolution to permit indexing of the work spindle through a given angular distance, and a second cam driven at a rate to make one revolution for a complete revolution of the work spindle and also operatively connected to said disengaging means to actuate the same to effect indexing of the work spindle independently of the machine cycle and through a different angular distance.

6. In a machine for producing gears having a normal machine cycle comprising alternate cutting and indexing, a work spindle, a stop plate operatively connected to the work spindle, means for locking the stop plate against rotation, means for rotating the stop plate, when released, to rotate the work spindle, a lever operatively connected to said locking means for disengaging said locking means, a cam operatively connected to said lever to actuate said lever, a second lever operatively connected to the first lever to operate said first lever, a second cam operatively connected to the second lever to actuate the second lever, means for rotating the first cam to make one revolution per machine cycle, and means for rotating the second cam at a rate different from the rate of rotation of the first cam.

7. In a machine for generating gears, a work spindle, a train of gearing for rotating the work spindle including a differential, means for locking one element of the differential against rotation during cutting, means for driving the other elements of the differential to effect generating rotation of the work spindle, means for actuating the first named element of the differential, when released, to effect indexing rotation of the work spindle, a pair of cams operatively connected to the locking means to disengage the same, and means for driving said cams at different rates.

8. In a machine for generating gears having a normal machine cycle comprising alternate cutting and indexing, a work spindle, a train of gearing for rotating said spindle including a differential, means for locking one element of the differential against rotation during cutting, means for driving the other elements of the differential to effect generating rotation of the work spindle, means for actuating the first named element of the differential, when released, to effect indexing rotation of the work spindle, a pair of cams operatively connected to the locking means to disengage the same, means for driving one of said cams at the rate of one revolution per machine cycle, and means for driving the other of said cams at the rate of one revolution during the production of a given gear.

LEONARD O. CARLSEN.